May 12, 1970  H. OSTERBERG  3,511,552

OPTICAL INTERFERENCE MICROSCOPY

Filed Aug. 30, 1966  4 Sheets-Sheet 1

INVENTOR.
HAROLD OSTERBERG

BY Stanley J. Yauner
ATTORNEY

May 12, 1970  H. OSTERBERG  3,511,552
OPTICAL INTERFERENCE MICROSCOPY
Filed Aug. 30, 1966  4 Sheets-Sheet 2

RAY FROM THE LASER

INVENTOR.
HAROLD OSTERBERG
BY
Stanley J. Yarnes
ATTORNEY

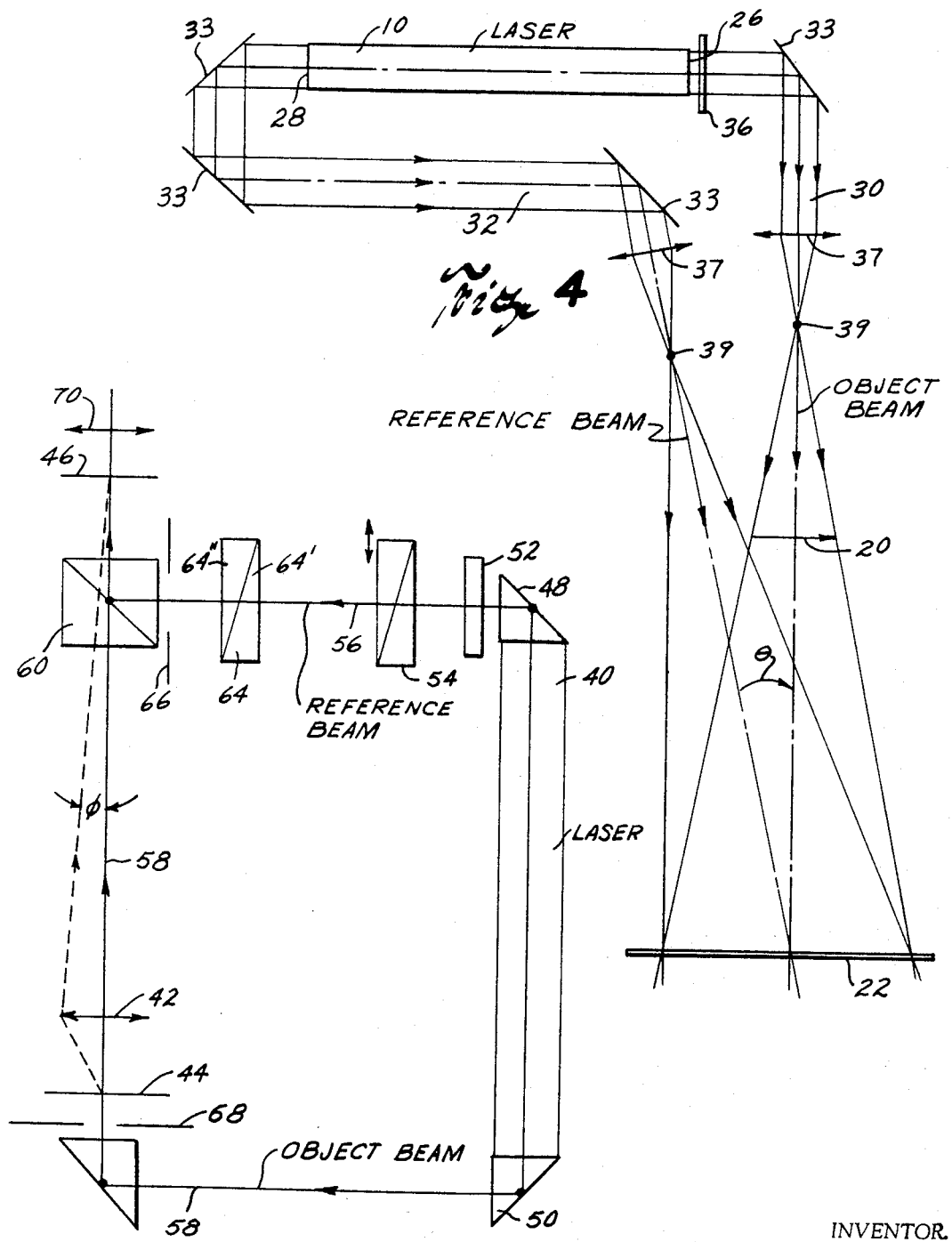

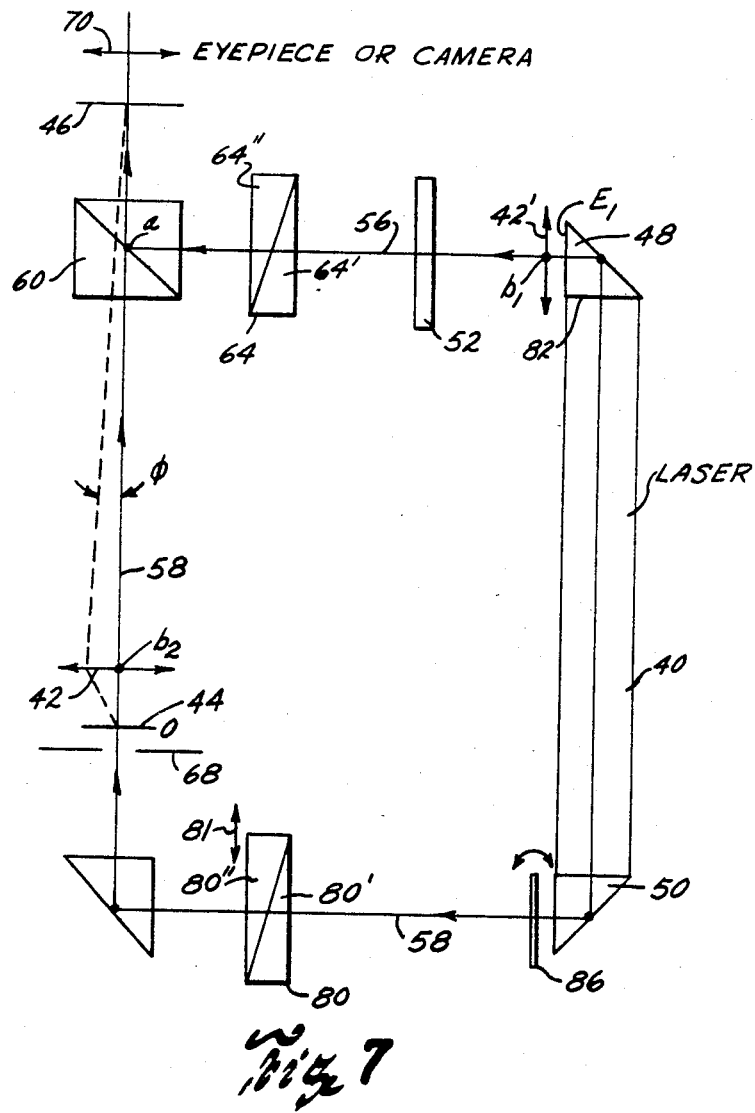

United States Patent Office 3,511,552
Patented May 12, 1970

3,511,552
OPTICAL INTERFERENCE MICROSCOPY
Harold Osterberg, Sturbridge, Mass., assignor, by mesne assignments, to American Optical Corporation, Southbridge, Mass., a corporation of Delaware
Filed Aug. 30, 1966, Ser. No. 576,115
Int. Cl. G02b 27/22, 21/06; G01b 9/02
U.S. Cl. 350—3.5
6 Claims

ABSTRACT OF THE DISCLOSURE

An interference microscope having an integral laser which discharges from both ends. The object and reference beams produced thereby are directed along separate optical paths which include variable absorbers, rotary prisms and rotary mirrors to control the relative amplitudes and directions of the two beams. These beams are directed to interfere at the microscope image plane from which the interference pattern can be viewed by an eyepiece or as the subject of a holographic recording.

---

This invention involves optical interference apparatus and more particularly an apparatus for producing and interfering coherent reference and object beams as in holography or as in interference microscopy.

In interference microscopy and holography the general means for producing the interfering light beams includes a beam splitter arrangement, which divides the light beam from a single source into reference and object beams. It has been found with such an arrangement that the beam s. ::er (along with any mirrors in the system), due to :: nature of its mounting and design, tends to be sub-, :· to variations in position resulting in irreparable dam-·?r to the desired result. Furthermore, especially in in-:..:ference microscopy, the light source, due to the use of a beam splitter, must be a physical extension of the generally tubular type arrangement of the microscope. For instance, the light source, if cylindrical, must either have its axis perpendicular to that of the microscope or be on the same axis (but an extension thereof) as that of the microscope (of course the light source if cylindrical could assume other positions, all of which extend the bulk of the microscope).

Accordingly, a primary object of the present invention is to provide means for producing and interfering reference and object beams for holography and interference microscopy.

A further object is to provide such means so that the use of beam splitting apparatus is avoided along with the concomitant optical complexities and mounting problems.

A still further object is to provide such means in a compact optical system.

These and other objects are accomplished in one illustrative embodiment of the present invention wherein a laser light source is provided for holographic or other interference use, the reference beam being obtained from one end of the laser and the object beam from the other.

Other objects, features and embodiments of the invention are contemplated and will be apparent from the following more detailed description of the invention with reference to the accompanying drawings, wherein:

FIG. 4 is a representation of a holographic apparatus according to the present invention wherein the diameter of the laser is smaller than that necessary to fill the field of view;

FIG. 6 is a schematic representation of optical apparatus including a laser source for an interference microscope wherein the microscope is uncompensated; and FIG. 7 is a representation of a compensated interference microscope using the present invention.

The art of holography is a representation of the use of interfering light beams. The basic idea was first developed almost twenty years ago but with the advent of the laser an entirely new field of technology has developed. The principle of holography involves a photographic plate which records an interference pattern of light waves from an object and reference beam, the object beam either going through a transparency (the object) or reflecting from the object and the reference beam by-passing the object. Since both beams have the same wavelength and traverse different paths their phase relationships will vary from point to point on the photographic plate causing interference fringes. Patterns of varying intensity are thereby recorded on the plate, so that when it is exposed with coherent light, the object materializes in space or on a screen.

Figure 1:
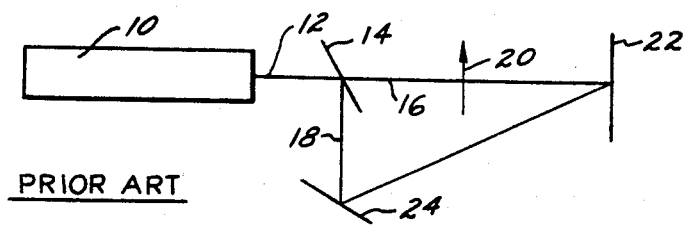
FIG. 1 is a representation of a means knonw in the art for producing a reference and object beam in holography.

Referring first to FIG. 1 there is shown a conventional holographic apparatus wherein a laser 10 produces a light beam 12 which is split by beam splitter 14 into an object beam 16 and a reference beam 18. The object beam 16 propagates by an object 20 to the photographic plate 22. The reference beam 18, on the other hand, is deflected by mirror 24 to the photographic plate 22 on a different path so that it does not propagate by the object 20.

Figure 2:
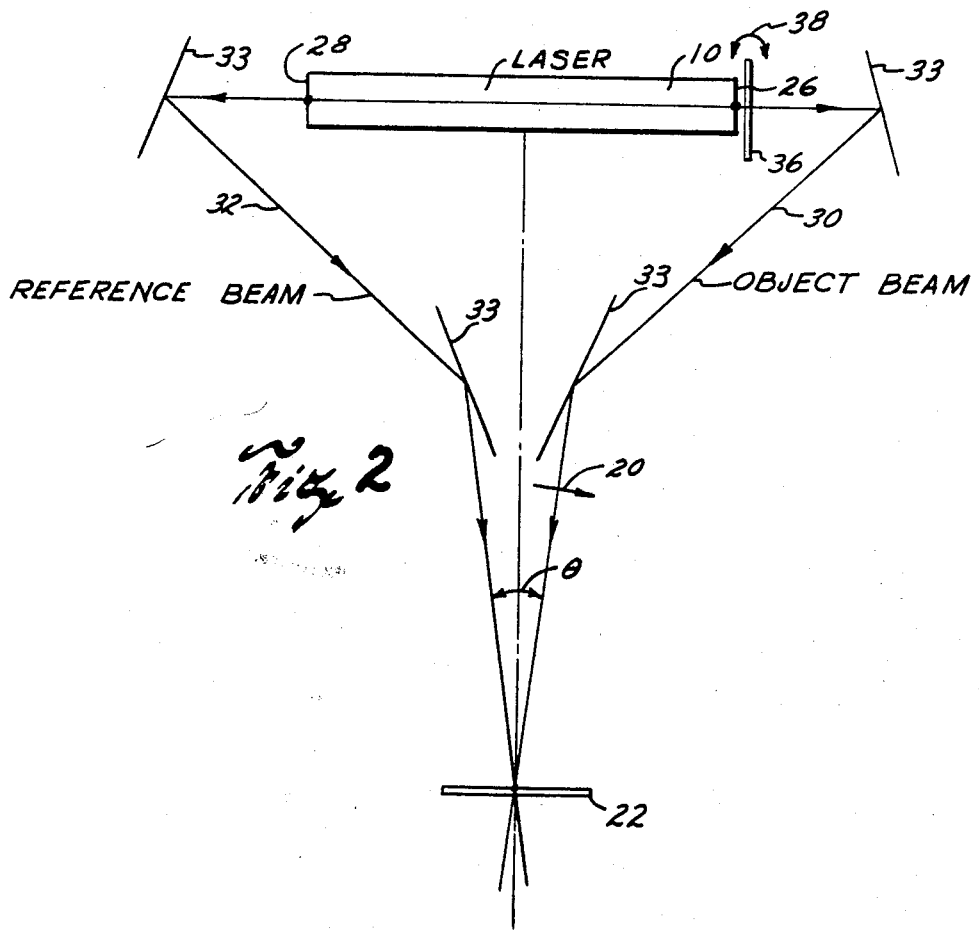
FIG. 2 is a representation of an optical arrangement using a laser source for holographic applications according to the present invention.

The present invention involves an apparatus as shown in FIG. 2 wherein the laser 10 is constructed to have partially transmitting ends 26 and 28 so that the laser output is emitted by each end. The output from end 26 is used as the object beam 30 and the output of end 28 is used as the reference beam 32. Mirrors 33 are provided along the paths of each beam so that both reach the holographic plate 22 to interfere with a desired angle θ between them. When it is desired to have the reference beam 28 impinge upon the holographic plate 22 with greater power than the object beam 30, an absorber 36 is placed in the path of the object beam in a tiltable mounting as represented by arrow 38 to increase the absorption as the absorber 36 is tilted to a position other than parallel with end 26 of the laser. As in the conventional hologram the object 20 is placed in the path of the object beam 30.

Figure 3:
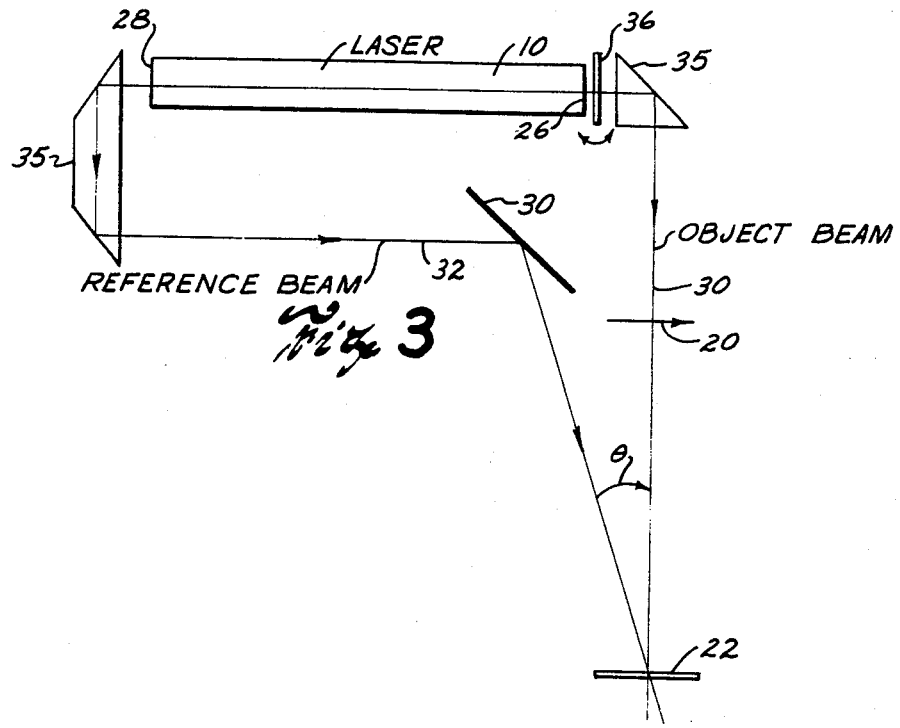
FIG. 3 is a holographic system according to the present invention herein the beam paths are unsymmetrical.

A further embodiment of the invention is shown in FIG. 3 wherein the laser 10 is likewise provided with partially transmissive ends, so that an object beam 30 is produced from one end of the laser and a reference beam 32 is produced from the other end. Prisms 35 are used to direct the reference and object beams as desired, but it should be understood that mirrors are likewise usable in this scheme. When the unsymmetrical arrangement of FIG. 3 is used, the end 28 is preferably designed to emit twice as much power as end 26 of the laser; but, in the alternative or in addition the absorber 36 can be employed.

When due to unavaliability of a large diameter laser or the intent to avoid additional expense, a laser is used which is of a diameter smaller than that needed to fill the field of view, lenses are inserted in the paths of the object and reference beams for diverging those beams.

Figure 5:
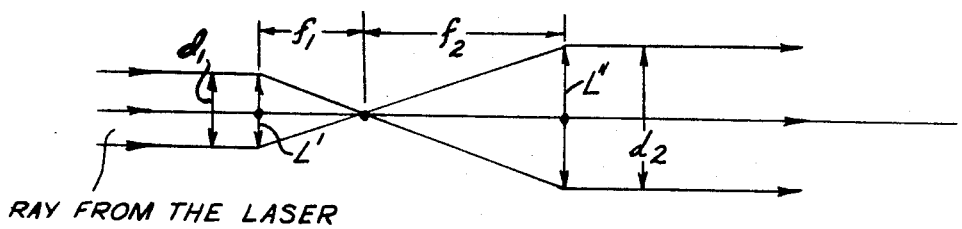
FIG. 5 is an afocal telescopic system for use with the apparatus of FIG. 4 when parallel reference and object beams are desired.

FIG. 4 is an illustration of a holographic system wherein lenses 37 are used for such a purpose. The object 20 is placed far enough from the focal points 39 to diverge both beams to a field of view large enough for the object. When parallel (nondivergent) reference and object beams are desired the simpler lenses 37 of FIG. 4 are replaced by afocal telescopic systems as depicted in FIG. 5. The magnification of the system will be equal to the diameter of the output of the afocal system $d_2$ divided by the diameter of the input $d_1$ to the afocal system, or the ratios of the focal lengths $f_2$ and $f_1$ of the lenses L'' and L'. When the afocal system is used, it is placed next to the laser and hereinafter should be considered as part of the laser 10.

It should be understood that the foregoing hologram devices can include Brewster angle apparatus to render the outgoing light plane polarized. The laser is oriented properly with respect to the system of mirrors so that the electric vector of the polarized light vibrates either in or at right angles to the plane of incidence of the system of mirrors. These principles are also applicable to the illustrative embodiments of the present invention to be described hereinafter.

A particularly useful area of application for the present invention is that of interference microscopy. A more compact instrument is made possible by the use of a double output laser since the laser can occupy one arm of the interferometer and can therefore be incorporated into the expanded body tube of the microscope. This body tube can be a block of metal with two bores, one for the objective-eyepiece assembly and the other for the laser 10. Also, a much less coherent laser than that described with reference to the holographic applications is desirable to avoid the formation of interference fringes in the field of view of the interference microscope. It should also be understood with reference to FIGS. 6 and 7 that the temporal coherence length should be equal to or slightly greater than the length of time required for the light beam to traverse the body tube. Furthermore, the principles of the interference microscope which pertain to the present invention are likewise applicable to a holographic microscope.

In FIG. 6 an uncompensated interference microscope for functioning with small fields of view is shown wherein the reference beam 56 does not have an objective to balance the objective 42 located in the object beam 58. The objective 42 is for focusing the object plane 44 into the image plane 46. When there is a high degree of coherence of the laser 40, the inequality of the object paths is inconsequential. The object beam 58 is incident substantially normally on the object plane 44 and the reference beam 56 is likewise incident normal to the image plane 46. The beam splitter 60 is used here but would be in addition to one adjacent the laser 40 in a conventional scheme. The laser 40 used for the application of FIG. 6 has reflecting end mirrors 48 and 50 rigidly attached to the ends of the laser 40. Variations on end mirrors and/or Brewster angle devices, etc. can be incorporated as desired. FIG. 6 shows mirror 48 reflecting the reference beam 56 from the laser and end mirror 50 reflecting the object beam 58. The end mirrors or prisms can be rigidly affixed to the laser ends so that a vibration in the plane of the drawing of the laser produces displacement of both beams and concomitant compensation of one beam motion for the other. In an interference microscope amplitudes reaching the image plane 46 from the object and reference beams are nearly alike and the objective 42 magnifies and decreases the amplitude of the object beam 58 at the image plane 46 by the factor $1/M$. Hence the laser should preferably be designed to deliver a greater power output to the object beam 58, since the instrument is uncompensated. The beam splitter 60 is designed to favor transmittance of the object beam 58, but this is usually not enough, since the objective 42 is exchanged for one having a higher magnification. A reasonable solution to this problem is to insert an absorbing plate 52 of suitable thickness for the objective 42 to approximately balance the amplitude of the object and reference beams as they reach the image plane 46. When it is found that the absorbing plates 52 do not accomplish complete amplitude balance due to the change of the relative output of the laser 40 to the object and reference beams with time, slidable absorbing wedges 54 are introduced to solve this problem. The wedges 54 are adjusted to secure amplitude balance by the microscope user observing the background of the field of view and adjusting the wedges for best extinction of the field. The amplitudes are then alike and the beams are out of phase. An additional further adjustment renders the reference and object beams in phase and the background field at its brightest. Either dark or bright contrast is thus obtained at will.

With further reference to FIG. 6 it is highly desirable to alter at will (within narrow limits) the angle $\phi$ between the reference and object beams as they strike the image plane 46. This is accomplished with the aid of adjustable rotary prism 64. When $\phi$ equals zero a single fringe spreads over a large section of the field of view. By making $\phi$ unequal to zero, a set of straight fringes are seen as separated by an amount that decreases with an increasing angle. The rotary prism 64 should be rotatable as a whole as well as rotation of one of the wedges 64' with respect to the other 64''. Iris diaphragms 66 and 68 represent an additional refinement for controlling the diameter of the object patch which is illuminated by the object beam, and for controlling the diameter of field illuminated by the reference beam at the image plane. The diameter of the field illuminated at the plane 46 by the reference beam and the magnified, illuminated object patch should be approximately equal.

To convert the arrangement of FIG. 6 into a holographic microscope, it is necessary to provide a rotary prism 64 for permitting larger angles $\phi$ of the order of 2° or 3° and to place the hologram at, or on either side of, the image plane 46. In holography it is desirable that the reference beam be at least twice as strong as the object beam at the plane of the hologram 70. Hence absorbing plates 52 with less absorption should be substituted when exposing the hologram film. The use of the arrangement could therefore be as an interference microscope to view the object specimen in order to make a decision whether or not to make a hologram. Then after switching plate 52 and perhaps inserting a stronger rotary wedge 64, the hologram can be exposed.

A compensated interference microscope is illustrated in FIG. 7 with the difference between that and FIG. 6 being primarily in the insertion of an objective 42' in the reference beam 56. The two distances $ab_1$ and $ab_2$ are quite similar. Another difference illustrated in FIG. 7 is the use of wedge 80 in the object beam. In the interference microscope the amplitudes of the reference and object beams as they arrive at the image plane 46 are matched by choosing a suitable absorbing plate 52 and by using absorbing wedges 80 as the fine adjustment by sliding one wedge 80' with respect to the other 80'' as indicated by arrow 81. The power output of the two ends of the laser 40 can thereby be substantially equal.

Furthermore, in FIG. 7 the end reflectors 82 and 86 are illustrated, with end reflector 86 being adjustable with respect to reflector 82. It should further be understood that precise close matching of the objectives 42' and 42 is highly desirable. The magnifications of the objectives 42 and 42' are reasonably alike in order not to upset the relative strengths of the object and reference beams by large amounts as they reach the image plane every time the objective is changed. One great advantage of the use of compensating objectives is that the contours of the reference wave front and the object wave front as they reach the image plane are quite similar. Therefore, a larger usable field of view can be obtained in the compensated case and a single fringe can be spread over substantially the entire field of an ordinary eyepiece 70. As with FIG. 6, the arrangement of FIG. 7 is easily convertible to a holographic microscope.

I claim:

1. An optical interference apparatus for use in an interference microscope comprising:
    a laser source of coherent light having an end reflector on each of its ends and producing an object beam at one end and a reference beam at the opposite end thereof;
    a microscope objective disposed in the path of at least one of said beams;
    a beam combining prism disposed in the path of each of said beams from which each of said beams is directed to an image plane;
    adjustable absorbing wedges disposed in the path of at least one of said beams to vary the intensity of such beam prior to its reaching said image plane;
    a rotary prism disposed in the path of at least one of said beams to adjustably vary the relative angles of incidence of said beam on said image plane; and,
    the end reflector on at least one end of said laser source being adjustable to control the axis of its corresponding beam.

2. The invention according to claim 1 wherein said apparatus further comprises a hologram film and said first and second beams are caused to interfere at said film.

3. The invention according to claim 2 wherein said apparatus further comprises afocal telescope lens means in the path of each of said first and second beams for enlarging said beams with each having parallel rays.

4. The invention according to claim 1 wherein said apparatus further comprises afocal telescope lens means in the path of each of said first and second beams for enlarging said beams with each having parallel rays.

5. The invention according to claim 1 wherein said laser source is arranged to have its axis parallel to the axis of said microscope.

6. The invention according to claim 1 wherein said first beam is propagated through an iris diaphragm and said second beam is propagated through an iris diaphragm.

References Cited

UNITED STATES PATENTS

| | | |
|---|---|---|
| 2,770,166 | 11/1956 | Gabor. |
| 3,162,713 | 12/1964 | Koester et al. _____ 350—12 |
| 3,230,475 | 1/1966 | Koester et al. _____ 331—94.5 |

OTHER REFERENCES

Meier "Magnification and Third-Order Aberrations in Holography," Journal of the Optical Society of America, vol. 55, No. 8, August 1965, pp. 987–992.

Spitz et al. "Reconstitution dans l'Espace d'Une Courbe Enregistree par Deplacement d'Um Point Lumineur," C.R. Acad. Sc. Paris, vol. 262, March 1966, pp. 758—760.

"Holographic Microscope Makes 3–D Specimen Photos," Laser Fucus, vol. 2, No. 11, June 1, 1966, p. 7.

JOHN K. CORBIN, Primary Examiner

U.S. Cl. X.R.
350—12; 356—106